United States Patent

[11] 3,596,097

[72] Inventor Jean J. Robillard
 46 Rue de Montgeron, 91 Brunoy, France
[21] Appl. No 809,266
[22] Filed Mar. 21, 1969
[45] Patented July 27, 1971

[54] INFRARED DETECTION AND IMAGING APPARATUS EMPLOYING QUENCHABLE LUMINESCENT PHOSPHORS
 10 Claims, 5 Drawing Figs.
[52] U.S. Cl............................................250/83.3 HP,
 250/83.3 H, 250/213 VT
[51] Int. Cl........................................... H01j 31/49
[50] Field of Search............................................ 250/83.3
 IR, 83.3 FRI, 213 VT

[56] References Cited
UNITED STATES PATENTS
2,920,205 1/1960 Choyke ........................ 250/83.3 IRI
2,951,175 8/1960 Null............................... 250/83.3 IRI
3,015,731 1/1962 VanSanten et al............. 250/83.3 IRI
3,370,172 2/1968 Hora ............................. 250/83.3 IRI Primary Examiner—Archie R. Borchelt
Attorney—Darby & Darby ABSTRACT: Infrared detection and imaging apparatus are disclosed based on the change in the dielectric constant of an infrared quenchable luminescent phosphor (and thus the capacity of a capacitive element) when exposed to infrared radiation. A mosaic of capacitive elements located in an image plane is scanned by an electron beam to produce an electrical signal representing an infrared radiation distribution pattern. This change in dielectric constant occurs at significantly lower energy levels than the actual visible quenching level of the phosphor. Local infrared detectors as well as infrared image detection apparatus may be constructed based on changes in capacitance when such phosphor is used as the dielectric material.

PATENTED JUL 27 1971

INVENTOR
JEAN J. ROBILLARD

BY Darby & Darby

ATTORNEYS

PATENTED JUL 27 1971

INVENTOR
JEAN J. ROBILLARD

BY Darby & Darby

ATTORNEYS

INFRARED DETECTION AND IMAGING APPARATUS EMPLOYING QUENCHABLE LUMINESCENT PHOSPHORS

This invention relates generally to infrared detection and imaging apparatus. In particular, it relates to apparatus based on the phenomenon of quenching of the luminescence of a phosphor by infrared radiation and the resulting change of dielectric constant of the phosphor related to the quenching process.

A variety of infrared detection and imaging systems have been used in the prior art, particularly for night vision improvement and medical thermography. Each of these systems possesses inherent limitations or disadvantages reducing its utility.

One class of prior art systems uses an infrared point detector and mechanical scanning to reproduce a given infrared image. Photoconductive- or photovoltaic-type detectors are frequently used in these systems which have good sensitivity but limited spectral response and also require cooling to low temperatures with liquid helium or nitrogen. Included also in this class are thermosensitive detectors such as bolometers which cover a broader spectral band and can operate at room temperature but are less sensitive.

A second class of systems uses linear or two-dimensional arrays of infrared detectors and electron beam scanning to produce an infrared image simulation electronically. What is usually done is to make a mosaic of detectors to be scanned; however, difficulties in making the mosaic have limited the possible structural materials to silicon and germanium. Spectral response of such systems, therefore, is limited to below 2 micrometers.

An additional use for a simple, economical infrared detection and imaging system would be in medical thermography to replace the present oil film technique, which is impractically cumbersome and uneconomical; or the other existing systems with above-mentioned limitations.

A recent promising development in infrared detection and imaging has been obtained by quenching the luminescence of certain phosphors. The infrared image appears visible in black on the luminescent background of a phosphor layer which is excited by an ultraviolet source. The spectral response of such a system extends far beyond most of the prior art systems, but the sensitivity is rather poor. This limitation occurs because sensitivity is optimum for low ultraviolet illumination levels and under such circumstances the viewing is poor. Although methods do exist for increasing the sensitivity, e.g. light amplifiers or closed-circuit TV using vidicons, a completely satisfactory solution providing maximum spectral response and maximum sensitivity has yet to be found.

It is an object of this invention, therefore, to provide infrared detection and imaging apparatus of high sensitivity operable at room temperature.

It is another object of this invention to provide infrared detection and imaging apparatus of high sensitivity operable over a broad spectral range.

It is a further object of this invention to provide infrared detection and imaging apparatus which affords a gain in sensitivity as compared with systems based on direct viewing of the quenching of luminescence.

Still another object of the invention is to provide infrared detection devices capable of being built up in a mosaic and of being rapidly scanned.

In accordance with the invention, infrared image detection apparatus for use in imaging systems comprises means for imaging infrared radiation at an image plane and means for supplying a source of ultraviolet radiation. Also included is a screen at the image plane including an infrared quenchable luminescent phosphor layer responsive to the ultraviolet and infrared radiation, a continuous conductive layer on one side of the phosphor layer, and a mosaic of conductive elements on the other side of the phosphor layer so that changes in the dielectric constant of the phosphor layer between the continuous conductive layer and respective mosaic elements in accordance with local infrared intensity under ultraviolet excitation produces change in electrical capacity between respective mosaic elements and the continuous conductive layer. Additionally, means for scanning the mosaic of the screen with an electron source are included to produce an electronic signal instantaneously proportional to the capacity corresponding to the mosaic element being scanned and therefore representative of the given infrared image.

For a better understanding of the present invention together with other and further objects thereof, reference is made to the following description taken in connection with the accompanying drawings, and its scope will be pointed out in the appended claims.

Luminescence occurs when ultraviolet light impinges upon a suitable luminescent surface. As mentioned earlier, when infrared radiation of sufficient intensity falls on certain types of such luminescent surfaces, a quenching of luminescence is known to occur, causing the quenched area to appear dark or black. A discovery of substantial importance in development of the present invention is that, in addition to quenching per se, significant changes of the dielectric constant of an infrared quenchable luminescent phosphor occur with changes of radiation exposure.

When such a phosphor is exposed to ultraviolet radiation and is caused to luminesce, the dielectric constant of such material increases. It was also discovered that when the phosphor in its luminescent state is exposed to infrared radiation, a major decrease in the dielectric constant of the phosphor occurs.

This change in dielectric constant is optimum for low energy levels of ultraviolet excitation of the phosphor and large changes in the dielectric constant occur for infrared radiation levels far less than required for visible quenching of the luminescence. Changes in the order of 4 to 1, for example, from a dielectric constant of 20 prior to infrared excitation, to one of 5 after exposure, have been observed.

Therefore, if the dielectric constant of a layer of luminescent phosphor were sensed as it was exposed to an infrared image, a much higher infrared detection sensitivity could be achieved than by direct viewing of the phosphor screen. Since the change in dielectric constant is conveniently associated with change in capacitance of a capacitor, apparatus constructed to sense change in capacity to produce a representative electrical signal is particularly effective; such apparatus will be henceforth described.

Figure 1:
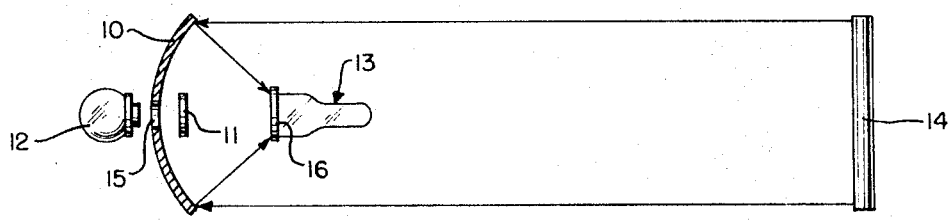
FIG. 1 is a partially schematic sectional view of an infrared imaging system including sources of infrared and ultraviolet energy and an image pickup tube.

Referring first to FIG. 1, an infrared imaging and detection system is shown. Infrared radiation is produced by an infrared-emitting object 14 and focused by a parabolic mirror 10. The mirror 10 directs the infrared image to an image plane at which a screen 16 is located. An ultraviolet source 12 supplies ultraviolet radiation to screen 16 through an aperture 15 in mirror 10. Since most practical ultraviolet sources also emit infrared light, a filter 11 may be needed to eliminate undesired infrared energy. Screen 16 includes a selected phosphorescent material such that the ultraviolet light will cause the screen to luminesce and infrared radiation of the proper level will cause quenching. Screen 16 is part of an image tube 13, which will now be described in detail.

Figure 2:
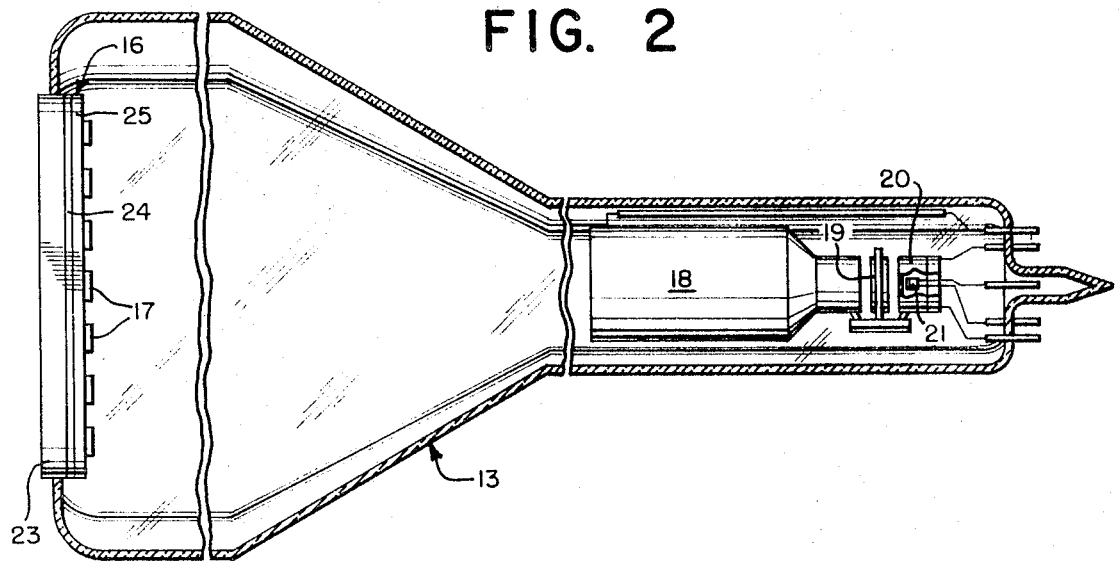
FIG. 2 represents an expanded view of a single-window image pickup tube indicated in FIG. 1.

In FIG. 2, the details of one embodiment of image tube construction is shown. The tube 13 includes a window 23 which is transparent to both infrared and ultraviolet and which may be made of corundum or fused silica for example. The elements of the tube 13 are sealed in a glass envelope. An important feature of the tube is the screen 16 at an image plane. Screen 16 includes an infrared quenchable luminescent phosphor layer 25 which is responsive to the ultraviolet radiation and the infrared image. On one side of phosphor layer 25 is a continuous conductive layer 24, and a mosaic 17 of mutually insulated conductive elements is located on the other side. Also shown within the tube are an electron gun filament 21, an oxide-coated cathode 20, an anode 19, and an electron beam electrode structure 18 which may be of any conventional types suitable for the intended function. It should be noted that in the arrangement of FIG. 2, continuous conductive layer 24 must be transparent to infrared and ultraviolet radiation and may be constructed of nesa glass or other suitable transparent conductive material. As layer 24 does not lend structural support in the apparatus it may be very thin.

The phosphor layer 25 is caused to luminesce by the impinging ultraviolet radiation. If one visualizes each respective mosaic element and the conductive layer 24 as defining a capacitor, with a corresponding portion of the phosphor layer as the dielectric thereof, then as local infrared energy varies, the dielectric constant and, therefore, capacity between respective mosaic elements and the continuous conductor layer will vary accordingly. Thus an image which was initially a function of infrared energy will be transformed to a function of capacity.

To extract the information encoded on the mosaic in terms of capacities, the mosaic is scanned with an electron source to produce an electronic signal instantaneously proportional to the capacitance corresponding to the mosaic element being scanned and therefore representative of the given infrared image. As shown in FIG. 2, this scanning electron source is a conventional electron gun and scanning electrodes. Each capacitive element is charged as the electron beam scans that element. The capacitance of each element and hence the charging current for it is inversely related to infrared radiation intensity on the element. This charging current is sensed as it flows through the conductive layer 24, which typically would be connected to a load (e.g. a video amplifier). The current through the load during a scan cycle represents the infrared image in electrical form. For a practical system it is desirable that the charge on each capacitive element substantially leak off during the scanning cycle, that it be self-discharging. If the conductivity of the phosphor alone is insufficient to discharge a capacitive element in the scan period, it may readily be increased by addition of suitable conductive particles in the binder with the phosphor.

Figure 3:
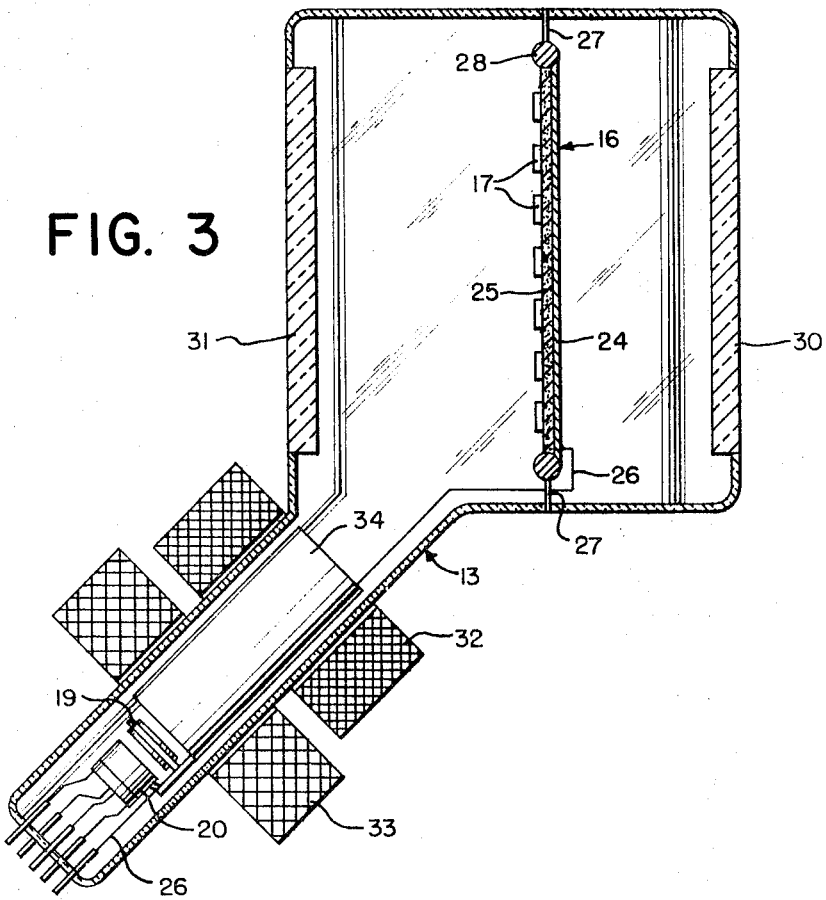
FIG. 3 is a partially schematic sectional view of a two-window image pickup tube, one window for ultraviolet radiation and the other for infrared radiation.

As an alternative to the image tube shown in FIG. 2, refer to the embodiment indicated in FIG. 3. This embodiment allows more flexibility in the choice of windows. Two separate windows are used, one for infrared 30, and the other for ultraviolet 31. As shown, the two windows would form the bases of a cylinder containing screen 16, with the electron gun portion protruding. The sealed glass envelope image tube 13 contains the electron gun elements (filament, cathode and anode) and a permalloy core 34; focusing coils 33 and deflecting coils 32 are external to the tube. Also contained within the tube is the screen 16, including conductive layer 24, phosphor layer 25, and conductive mosaic 17. The infrared-passing window may be made of germanium for example, while the ultraviolet window may be typically made of quartz.

The operation of the two-window tube is the same as that of the single window, resulting in an electronic signal representative of a given infrared image. For the two-window tube, the optical arrangement shown in FIG. 1 is not needed, since the infrared energy and ultraviolet energy may be directly supplied to a respective window.

The manufacture of the transparent conductive layer 24 and the conductive mosaic may be accomplished by evaporation under vacuum. The phosphor layer 25 can be prepared by one of several ways: (1) coating of the transparent front electrode with the phosphor dispersed in a suitable binder, or (2) evaporating the phosphor under vacuum on the transparent front electrode, or (3) precipitation of the phosphor from a suspension in a suitable liquid.

Of the aforementioned methods, the first is preferred. The phosphor is chosen from those luminescent phosphors suitable for quenching by infrared radiations, particularly ZnS phosphors containing Cd, Ni and Ag impurities. A preferred composition for such a phosphor is ZnS—86 grams, CdS—14 grams, NaCl—1 gram, $AgNo_3$—0.03 gram, and $NiCl_2$—1 gram, which is ball-milled for 24 hours and then fired in inert atmosphere for 10 minutes at a temperature of 650° C. Another suitable composition is ZnS—100 grams, CdS—9 grams, $AgNO_3$—10 grams, $CuCO_3Cu$ $(OH)_2$—0.1 gram, $Al_2O_3$—0.1 gram, and KC1—4 grams, which is ball-milled for 24 hours and fired in inert atmosphere during 10 minutes at 825° C. Excellent results have also been obtained with a commercial phosphor produced by U.S. Radium Corp. of Morristown, New Jersey, under the name "Radelin No. 1807."

If the phosphor layer is prepared by the first method of coating, several types of binders may be used such as Pliolite S-7, a polybutadiene resin manufactured by Goodyear Chemical Company, Akron, Ohio, or "Zytel 60," a nylon resin manufactured by Dupont de Nemours. In both cases, the preferred phosphor-to-binder ratio is 5:1.

In the two image tube embodiments the screen may be mounted within the tube by either of two ways. In FIG. 2, the screen is mounted directly on the surface of the window. If this method were used in the two-window tube, the screen would be mounted directly on the infrared window 30.

Figure 4:
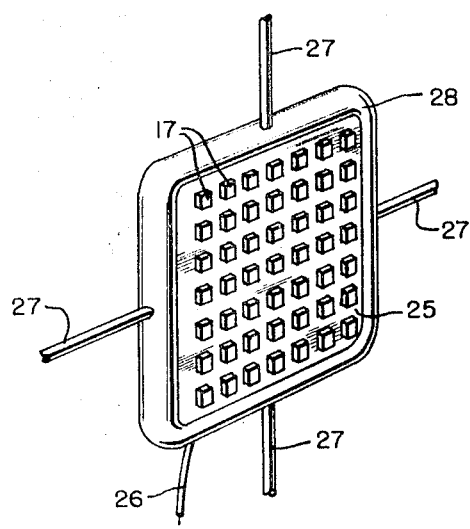
FIG. 4 shows, in partially schematic form, a screen formed in a special frame, a technique which may be used in either tube aforementioned.

As shown in FIG. 3 and FIG. 4, the screen is held by means of a frame. The screen is formed by building up a phosphor film which is sustained by frame 28 which is supported by pins 27 inserted in the envelope of the tube. A transparent conductive layer is evaporated on one side of the film and the conductive mosaic on the other side. The screen is mounted in front of the desired window in either embodiment without mechanical contact to it. As shown in FIGS. 3 and 4, the electrical connection 26 is made to the transparent conductive layer and brought out to a pin for further use.

Figure 5:
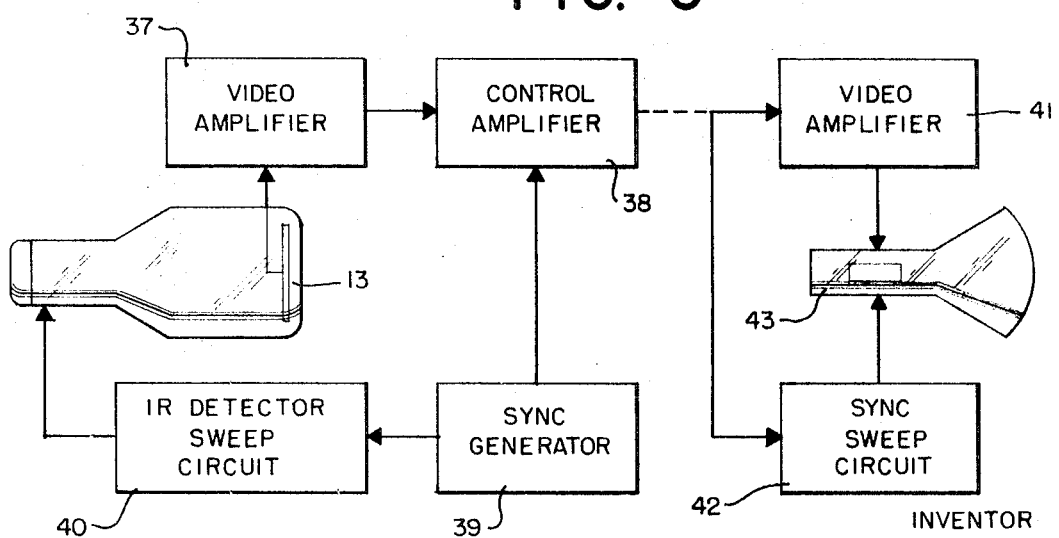
FIG. 5 is a schematic block diagram of circuitry which may be used for displaying the detected infrared image.

FIG. 5 illustrates apparatus for obtaining a visible display of the detected infrared image. The electron beam image pickup tube 13 is controlled by a sweep signal generated by sync generator 39 and an infrared detector sweep circuit 40. The output of the image tube 13 is amplified by video amplifier 37. The video output is then coded with the sync signal provided by sync generator 39 in control amplifier 38. The control amplifier output signal may either be converted to television frequencies and transmitted or may simply be connected to appropriate circuitry for driving a cathode-ray tube 43. Such circuitry, video amplifier 41 and sync sweep circuit 42 would be necessary in either case except that reception and radio frequency detection would be required prior to the video amplifier 41 if the signal were transmitted. The CRT display is the visual simulation of the given infrared image. The apparatus of FIG. 5 comprises circuits well known in the television art and accordingly has been only briefly described.

It should be clear that the invention disclosed herein is capable of many different variations. For example, a single capacitor made with an infrared quenchable luminescent phosphor as a dielectric and having at least one plate transparent to infrared and at least one plate transparent to ultraviolet energy, would make an excellent local infrared detector. Means must be provided for developing an electrical signal proportional to the instantaneous capacitance of said capacitor. Based on such a device, a mosaic may also be built up which provides parallel electrical outputs if speed were a requirement.

Although the foregoing discussion has included what is believed to be a correct description of the phenomena involved, nevertheless the claimed invention is predicated on the actual observation of the functioning device rather than on the underlying theory.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What I claim is:

1. Infrared image detection apparatus for use in imaging systems comprising:
   means for imaging infrared radiation at an image plane;
   means for supplying a source of ultraviolet radiation;
   a screen at said image plane including an infrared quenchable luminescent phosphor layer responsive to said ultraviolet radiation and said infrared image, a continuous conductive layer on one side of said phosphor layer, and a mosaic of conductive elements on the other side of said phosphor layer, said screen forming a multiplicity of capacitive elements, each capacitive element having a corresponding one of said mosaic elements as one plate thereof, said conductive layer as an opposite plate thereof, and an adjacent portion of said phosphor layer as a dielectric, so that a change in the dielectric constant of said phosphor layer within each capacitive element in accordance with local infrared intensity produces a corresponding change in electrical capacity of said capacitive element; and
   means for scanning said mosaic of said screen with an electron source to produce an electronic signal instantaneously related to the capacitance of the capacitive element corresponding to the mosaic element being scanned and therefore representative of the incident infrared radiation.

2. Apparatus as described in claim 1, wherein said screen and said scanning means are elements of a sealed tube having a window transparent to ultraviolet and infrared energy facing the continuous conductive layer of said screen.

3. Apparatus as described in claim 2, wherein said means for imaging infrared radiation at an image plane includes a curved mirror, having an aperture, for directing said infrared radiation to said screen and wherein said ultraviolet radiation is supplied to said screen through said aperture.

4. Apparatus as described in claim 1, wherein said mosaic is transparent and said screen and scanning means are elements of a sealed tube having two windows positioned in opposition, one transparent to ultraviolet and the other transparent to infrared energy and wherein said screen is positioned between said two windows.

5. Apparatus as described in claim 1, wherein said infrared quenchable luminescent phosphor layer includes predetermined quantities of zinc sulfide, cadmium sulfide and silver nitrate.

6. An infrared detector for sensing local infrared energy comprising:
   an infrared-sensitive capacitor, having an infrared quenchable luminescent phosphor as a dielectric and having at least one plate transparent to infrared and at least one plate transparent to ultraviolet energy;
   means for directing infrared energy to be detected to said phosphor;
   means for supplying ultraviolet energy to said phosphor; and
   means for developing an electrical signal proportional to the instantaneous capacitance of said capacitor whereby the dielectric constant of said dielectric and therefore the capacitance of said capacitor is changed in accordance with local infrared energy and said signal is representative of the local infrared energy.

7. Infrared image detection apparatus comprising:
   a multiplicity of infrared-sensitive capacitive elements located at an image plane, each having an infrared quenchable luminescent phosphor as a dielectric and each having at least one plate transparent to infrared and at least one plate transparent to ultraviolet energy;
   means for directing an infrared image to said image plane;
   means for supplying ultraviolet energy to said image plane; and
   means for scanning said capacitive elements to develop an electrical signal representative of the instantaneous value of each element, whereby the dielectric constant and therefore the capacitance of each capacitive element is representative of the local infrared energy of said infrared image and said output signal is representative of the given infrared image.

8. Apparatus as described in claim 7, which additionally includes means for converting said output signal to synchronously display a visual simulation of said infrared image.

9. Infrared image detection apparatus comprising:
   a multiplicity of infrared-sensitive capacitive elements located at an image plane, each having an infrared quenchable luminescent phosphor as a dielectric and each having at least one plate transparent to infrared and at least one plate transparent to ultraviolet energy;
   means for directing an infrared image to said image plane;
   means for supplying ultraviolet energy to said image plane; and
   means for developing a set of electrical signals representative of the instantaneous value of each element whereby the dielectric constant and therefore the capacitance of each capacitive element is representative of the local infrared energy of said infrared image and said set of signals is representative of the given infrared image.

10. Apparatus as described in claim 9, which additionally includes means for converting said set of electrical signals to display a visual simulation of said infrared image.